(12) United States Patent
Maher et al.

(10) Patent No.: US 11,663,514 B1
(45) Date of Patent: May 30, 2023

(54) MULTIMODAL INPUT PROCESSING SYSTEM

(71) Applicants: Megan M. Maher, San Francisco, CA (US); Barry-John Theobald, San Jose, CA (US); Nicholas E. Apostoloff, San Jose, CA (US)

(72) Inventors: Megan M. Maher, San Francisco, CA (US); Barry-John Theobald, San Jose, CA (US); Nicholas E. Apostoloff, San Jose, CA (US)

(73) Assignee: APPLE INC., Cupertino, CA (US)

( * ) Notice: Subject to any disclaimer, the term of this patent is extended or adjusted under 35 U.S.C. 154(b) by 287 days.

(21) Appl. No.: 16/899,677

(22) Filed: Jun. 12, 2020

Related U.S. Application Data

(60) Provisional application No. 62/893,864, filed on Aug. 30, 2019.

(51) Int. Cl.
*G06N 20/00* (2019.01)
*G06N 5/025* (2023.01)
*G06F 16/29* (2019.01)
*G06V 40/20* (2022.01)

(52) U.S. Cl.
CPC .............. *G06N 20/00* (2019.01); *G06F 16/29* (2019.01); *G06N 5/025* (2013.01); *G06K 9/6277* (2013.01); *G06V 40/20* (2022.01)

(58) Field of Classification Search
CPC ......... G06N 20/00; G06F 16/29; G06V 40/20; G06N 5/025
See application file for complete search history.

(56) References Cited

U.S. PATENT DOCUMENTS

| | | | |
|---|---|---|---|
| 9,743,239 B1* | 8/2017 | Mishra | H04W 4/023 |
| 9,836,056 B2* | 12/2017 | Ansari | G06T 17/00 |
| 9,950,708 B1* | 4/2018 | Cullinane et al. | G06V 20/56 |
| 10,029,682 B2* | 7/2018 | Gunaratne | B60W 10/18 |
| 10,106,153 B1* | 10/2018 | Xiao et al. | G08G 1/0141 |
| 10,133,275 B1* | 11/2018 | Kobilarov et al. | G06N 3/08 |
| 10,198,655 B2* | 2/2019 | Hotson et al. | G01S 17/931 |
| 10,235,882 B1* | 3/2019 | Aoude et al. | G08G 1/163 |
| 10,249,192 B2* | 4/2019 | Wittorf et al. | G08G 1/123 |
| 10,303,953 B2 | 5/2019 | Varerkar et al. | |
| 10,501,087 B2* | 12/2019 | Deragarden et al. | G01P 3/00 |
| 11,077,850 B2* | 8/2021 | Green et al. | B60W 30/0956 |
| 2013/0179382 A1* | 7/2013 | Fritsch et al. | G08G 1/161 706/46 |
| 2017/0031361 A1* | 2/2017 | Olson et al. | B60W 30/0956 |

(Continued)

FOREIGN PATENT DOCUMENTS

EP 3459812 A1 3/2019

*Primary Examiner* — Hua Lu
(74) *Attorney, Agent, or Firm* — Young Basile Hanlon & MacFarlane, P.C.

(57) ABSTRACT

Controlling an automated agent in an environment includes obtaining high-quality data regarding a current state of the automated agent; identifying a behavior model; determining a trajectory estimate for the automated agent based on the current state of the automated agent and the behavior model; determining a final trajectory for the automated agent using the trajectory estimate; and controlling the automated agent according to the final trajectory.

21 Claims, 7 Drawing Sheets

(56) References Cited

U.S. PATENT DOCUMENTS

| | | | | |
|---|---|---|---|---|
| 2017/0166123 | A1* | 6/2017 | Bahgat et al. | B60W 30/0953 |
| 2018/0259976 | A1* | 9/2018 | Williams et al. | G01C 21/005 |
| 2018/0274927 | A1 | 9/2018 | Epperlein et al. | |
| 2018/0314253 | A1* | 11/2018 | Mercep et al. | G01S 15/66 |
| 2019/0011917 | A1* | 1/2019 | Kuffner, Jr. | G09B 5/02 |
| 2019/0095731 | A1* | 3/2019 | Vernaza et al. | G06V 20/56 |
| 2019/0147255 | A1 | 5/2019 | Homayounfar et al. | |
| 2019/0287404 | A1* | 9/2019 | Vernaza et al. | G06N 5/046 |
| 2019/0392321 | A1* | 12/2019 | Weng et al. | G06N 3/082 |
| 2020/0051428 | A1* | 2/2020 | Yang et al. | G06N 7/005 |
| 2020/0307561 | A1* | 10/2020 | Bush et al. | B60W 60/00274 |
| 2020/0307564 | A1* | 10/2020 | Rahimi et al. | B60W 60/0011 |
| 2021/0070286 | A1* | 3/2021 | Green et al. | G05D 1/0088 |
| 2021/0089054 | A1* | 3/2021 | Lacaze et al. | B60W 40/10 |
| 2021/0370980 | A1* | 12/2021 | Ramamoorthy et al. | B60W 40/04 |

\* cited by examiner

MULTIMODAL INPUT PROCESSING SYSTEM

CROSS-REFERENCE TO RELATED APPLICATIONS

This application claims the benefit of U.S. Provisional Application No. 62/893,864, filed on Aug. 30, 2019, the content of which is hereby incorporated by reference herein in its entirety for all purposes.

TECHNICAL FIELD

This disclosure relates to systems that make control decisions based on information that is obtained from multiple modalities.

BACKGROUND

Some automated systems make control decisions that are dependent on predicted future states of other agents (e.g., people, animals, human-controlled machines, and computer controlled machines). Predicting the intent of each agent in an environment allows an automated system to predict the future state of an environment. As one example, the automated system may be a mobile robot, and predicting the future state of the environment allows the automated system to move with respect to the other agents in a manner that avoids collisions with the other agents.

Observable characteristics of the environment and the other agents can indicate intent. Rule-based approaches for predicting intent based on these types of observable characteristics become complicated because a rule (or set of rules) is required for each specific scenario that may be encountered. Machine-learning-based approaches typically use a fixed-length input that is not readily applicable to variable amounts of data that describe environment characteristics and agent characteristics.

SUMMARY

One aspect of the disclosure is a non-transitory computer-readable storage medium including program instructions executable by one or more processors that, when executed, cause the one or more processors to perform operations. The operations include obtaining high-quality data regarding a current state of the automated agent; identifying a behavior model; determining a trajectory estimate for the automated agent based on the current state of the automated agent and the behavior model; determining a final trajectory for the automated agent using the trajectory estimate; and controlling the automated agent according to the final trajectory.

In some implementations of the non-transitory computer-readable storage medium, the high-quality data represents a contemporaneous observation. In some implementations of the non-transitory computer-readable storage medium, the high-quality data includes a current geographic location of the automated agent. In some implementations of the non-transitory computer-readable storage medium, the high-quality data includes motion information for the automated agent. In some implementations of the non-transitory computer-readable storage medium, the high-quality data includes a three-dimensional position and pose of the automated agent.

In some implementations of the non-transitory computer-readable storage medium, the behavior model is identified based on an object type of the automated agent. In some implementations of the non-transitory computer-readable storage medium, the behavior model is identified based on characteristics of an environment around the automated agent. In some implementations of the non-transitory computer-readable storage medium, the behavior model is identified based on a current geographic location of the automated agent. In some implementations of the non-transitory computer-readable storage medium, the behavior model is based on non-contemporaneous observations. In some implementations of the non-transitory computer-readable storage medium, the behavior model is based on historical trajectories. In some implementations of the non-transitory computer-readable storage medium, the behavior model includes a prior probability distribution.

In some implementations of the non-transitory computer-readable storage medium, the trajectory estimate describes multiple trajectories and associated probabilities.

Another aspect of the disclosure is a method for controlling an automated agent in an environment. The method includes obtaining high-quality data regarding a current state of the automated agent; identifying a behavior model; determining a trajectory estimate for the automated agent based on the current state of the automated agent and the behavior model; determining a final trajectory for the automated agent using the trajectory estimate; and controlling the automated agent according to the final trajectory.

Another aspect of the disclosure is a non-transitory computer-readable storage medium including program instructions executable by one or more processors that, when executed, cause the one or more processors to perform operations. The operations include obtaining high-quality data regarding a current state of objects in an environment around an automated agent; determining object types for the objects in the environment; identifying behavior models for the objects based on the object types; determining object predictions describing future states of the objects in the environment, wherein the object predictions define an environment prediction; and controlling the automated agent according to the environment prediction.

In some implementations of the non-transitory computer-readable storage medium, the high-quality data represents a contemporaneous observation. In some implementations of the non-transitory computer-readable storage medium, the high-quality data includes a current geographic location of the automated agent. In some implementations of the non-transitory computer-readable storage medium, the high-quality data includes motion information for the objects. In some implementations of the non-transitory computer-readable storage medium, the high-quality data includes a three-dimensional position and pose of each of the objects.

In some implementations of the non-transitory computer-readable storage medium, the behavior models are identified based on characteristics of the environment around the automated agent. In some implementations of the non-transitory computer-readable storage medium, the behavior models are identified based on a current geographic location of the automated agent. In some implementations of the non-transitory computer-readable storage medium, the behavior models are based on non-contemporaneous observations. In some implementations of the non-transitory computer-readable storage medium, the behavior models are based on historical trajectories. In some implementations of the non-transitory computer-readable storage medium, the behavior models each include a prior probability distribution.

In some implementations of the non-transitory computer-readable storage medium, at least some of the object predictions are made based on the object predictions for other ones of the objects.

Another aspect of the disclosure is a method for controlling an automated agent in an environment. The method includes obtaining high-quality data regarding a current state of objects in the environment around the automated agent; determining object types for the objects in the environment; identifying behavior models for the objects based on the object types; determining object predictions describing future states of the objects in the environment, wherein the object predictions define an environment prediction; and controlling the automated agent according to the environment prediction.

DETAILED DESCRIPTION

Figure 1:
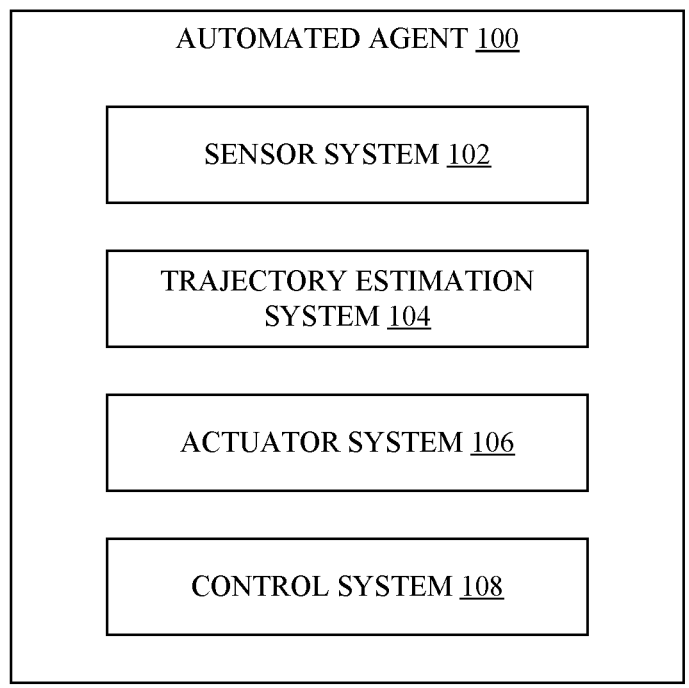
FIG. 1 is a block diagram that shows an automated agent that includes a multimodal input processing system.

In the systems and methods that are described herein, decisions are made by automated agents using data from multiple modalities. The decisions may include, as examples, control decisions for use in controlling systems of the automated agent, or predictions regarding the intentions and/or future actions of other agents, where the predictions are usable as inputs in making the control decisions.

The modalities are grouped herein into categories referred to as "weak data" and "high-quality data." Generally stated, weak data is previously collected from sources that do not directly represent the agents and/or environment that is the current subject of a decision or prediction, while the high-quality data directly represents the agents and environment that are the subject of decision or prediction. The systems and methods that are described herein are adapted to function using a relatively large amount of available weak data and a relatively small amount of available high-quality data. Although the weak data are noisy, reliable models can be generated by aggregating the weak data and using the high-quality data as an input signal.

The sparse high-quality data is data obtained through contemporaneous observations of the behavior of the agent whose behavior is currently the subject of prediction. The sparse high-quality data is the actual current behavior of the agent whose behavior is the subject of prediction, but the limited number of signals that can be obtained from contemporaneous observation make the sparse high-quality data less useful for prediction if used in isolation.

In the systems and methods that are defined herein, the large amount of noisy historical data that is encompassed by the weak data may be used to generate a prior probability distribution. By combining this prior probability distribution with the high-quality data, accurate predictions can be made by an automated system. As an example, the high-quality data may be used as an input to a model that is based on the prior probability distribution.

Some implementations of the systems and methods described herein are configured to plan a trajectory for an automated agent to navigate through an environment. An intended action is determined for the automated agent using a combination of sparse high-quality information that is collected (e.g., using sensors) from the environment contemporaneously, and using models that are based on a large volume of previously-collected information. The models are based on information that describe trajectories followed by other agents through the same environment or through similar environments. The model is used in combination with the high-quality information and other trajectory planning techniques to determine a motion plan for the automated agent.

Some implementations of the systems and methods described herein are configured to predict the future states of objects in an environment. For each object in the environment, a classification is determined, and other environmental features that may influence the behavior of the object are determined. An intended action is determined for the object using a combination of sparse high-quality information that is collected (e.g., using sensors) from the environment contemporaneously, and using models that are based on a large volume of previously-collected information. The models are configured to describe the likelihood that an object that belongs to a specific class of objects will take a particular action in the presence of environmental conditions that are similar to those that are present in the current environment.

When an automated agent is moving within an environment where other agents (e.g., moving objects of any kind including human-controlled machines, computer-controlled machines, people, and animals), the automated agent may be configured to determine its actions based on predicted future actions for the other agents. This helps the automated agent to better plan its own motion through the environment and avoid collisions with the other agents. There are features of both the environment and the other agents that can be used as a basis for predicting the intended future actions of the other agents. As one example, the systems and methods that are described herein may be applied to predict the motion of pedestrians that are walking along sidewalks, crosswalks, and/or other facilities within a roadway environment. Examples of features that may be used as a basis for understanding the future behaviors of pedestrians in a roadway environment include the trajectory of the pedestrian, the body pose of the pedestrian, gestures made by the pedestrian, the locations of sidewalks, the locations of crosswalks, the locations of roadways, and the locations of traffic signals or other right-of-way control devices.

Features may be object specific, such that they are relevant for a certain type of object and are not relevant for other types of objects. Particular features may or may not be available for consideration in predicting future intent at all times. For example, a pedestrian may or may not be moving in a manner consistent with a recognizable gesture at a particular point in time. As a result of this, the prediction models that are described herein may be configured such that they are flexible, and able to be applied to multiple types of objects and in the presence or absence of particular types of features.

Some implementations of the systems and methods that are described herein combine multimodal inputs of varying granularity to predict the intent of individual objects and then incorporate second-order effects to predict the impact that a predicted action by one agent will have on the intentions and future actions of the other agents in the environment. As an example of second-order effects in a roadway environment, when a pedestrian crosses a roadway using a crosswalk, the actions of vehicles that are present in the environment will be affected, because they are obliged to yield to the pedestrian according to conventional right-of-way rules in many jurisdictions.

FIG. 1 is a block diagram that shows an automated agent 100. The automated agent 100 is controlled using multiple modalities of data. As an example, the automated agent 100 may be an autonomous or semi-autonomous mobile robot that is configured to make observations regarding an environment and move within the environment in dependence upon the observations. In the illustrated example, the automated agent includes a sensor system 102, a multimodal input processing system 104, an actuator system 106, and a control system 108.

The sensor system 102 includes one or more sensor components that are able to collect information that describes the environment around the automated agent 100. The information may be in the form of sensor signals that may be interpreted to understand features of the environment. The sensor signals may include two-dimensional images of the environment, three-dimensional scans of the environment, audio data representing sounds present in the environment, and/or other types of signals.

The sensor system 102 may include one or more image capture devices, such as a visible spectrum still camera, a visible spectrum video camera, an infrared spectrum still camera, and/or an infrared spectrum video camera. The sensor system 102 may include a three-dimensional scanning device, such as a Lidar device, a laser scanner, an imaging radar, an ultrasonic scanning device, and/or a structured light scanning device. The sensor system 102 may include motion sensors, such as accelerometers, gyroscopes, and magnetometers (e.g., multiple sensors incorporated in an inertial measurement unit). The sensor system 102 may include a satellite positioning sensor that is operable to determine a geographical position of the automated agent 100 (e.g., latitude, longitude, and elevation coordinates). Other types of sensing components representing different sensing modalities may also be included in the sensor system 102.

The multimodal input processing system 104 is make decisions and/or predictions that can be used as input data for the control system 108 of the automated agent 100. The multimodal input processing system 104 is configured to combine data from different modalities, such as by combining large amounts of historical data with small amounts of contemporaneous data to utilize historical data as an input in control decisions for the automated agent 100 and/or to predict future states of other objects/agents that are present in the environment around the automated agent 100 and use predicted intentions and/or predicted future states of those objects/agents as inputs in control decisions for the automated agent 100. Multiple implementations of the multimodal input processing system 104 will be described herein, and it should be understood that these implementations may be combined or used simultaneously in the context of making control decisions for the automated agent 100.

The actuator system 106 includes one or more actuator components that are able to affect motion of the automated agent 100. The actuator components, either singly or in combination with other actuator components, may be configured to accelerate, decelerate, steer, or otherwise influence motion of the automated agent 100. The actuator components may cause movement of the entirety of the automated agent 100 in unison, or may cause relative movement of portions of the automated agent 100.

The control system 108 is configured to control operation of the automated agent 100 by determining a planned motion for the automated agent 100 and outputting commands that correspond to the planned motion. The commands are output to the actuator components of the actuator system 106 and cause operation of the actuator components. The planned motion for the automated agent 100 is determined based on the information that is output by the sensor system 102 and based on the information that is output by the multimodal input processing system 104. The planned motion for the automated agent 100 may also be based on other information, such as a current location of the automated agent 100, an intended destination for the automated agent 100, and features of the environment around the automated agent 100.

Figure 2:
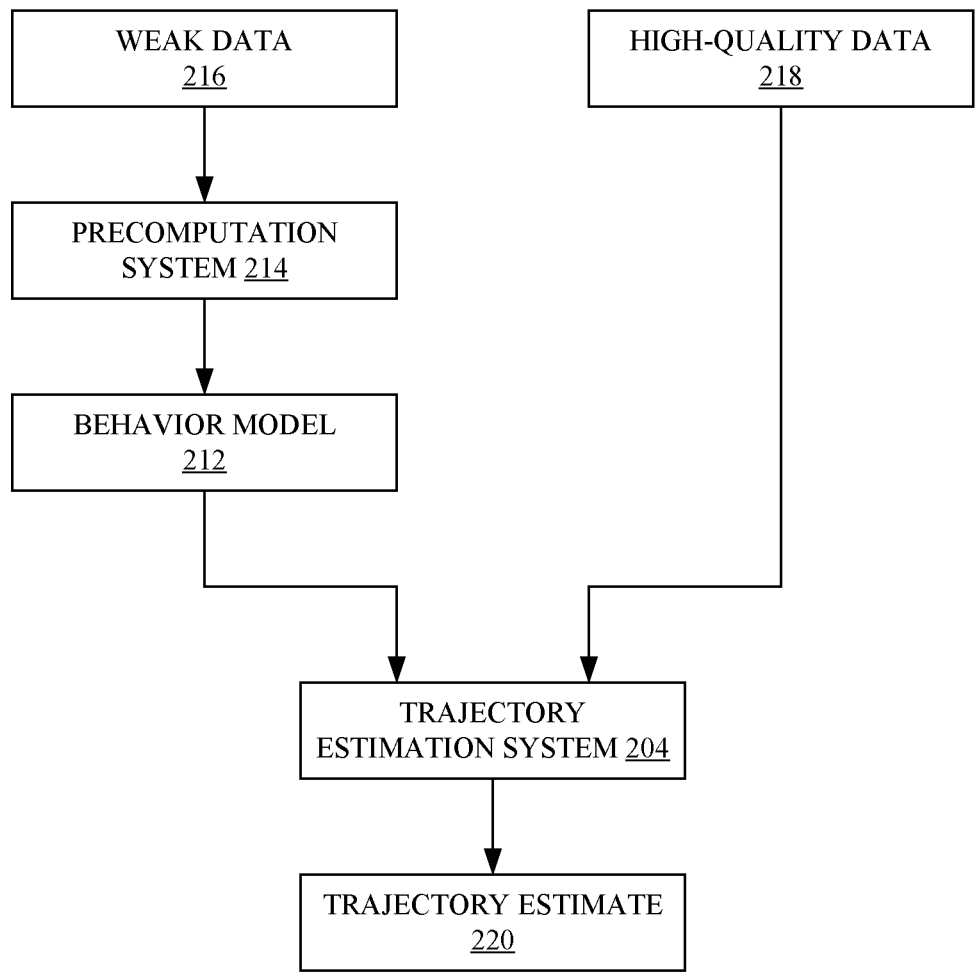
FIG. 2 is a block diagram that shows a trajectory estimation system.

FIG. 2 is a block diagram that shows a trajectory estimation system 204, which is an implementation of the multimodal input processing system 104 and may be implemented in the context of the automated agent 100. The description made with respect to the automated agent 100 and its various components is incorporated herein unless otherwise noted. The trajectory estimation system 204 is configured to estimate a likely future trajectory for the automated agent 100 based in part on historical data describing trajectories followed by other agents in the same environment or in a different environment. The information output by the trajectory estimation system 204 is used as a basis for controlling operation of the automated agent 100, such as by determining a motion plan for the automated agent 100 using the control system 108 of the automated agent 100 and determining commands for the actuator system 106 of the automated agent 100.

As a first input, the trajectory estimation system 204 receives a behavior model 212 that is determined by a precomputation system 214 using weak data 216. As a second input, the trajectory estimation system 204 receives high-quality data 218. The trajectory estimation system 204 generates a trajectory estimate 220 as an output. As an example, in the context of the automated agent 100, the trajectory estimate 220 can be provided to the control system 108 as an input that is used as a basis for making control decisions and determining commands for the actuator system 106.

The behavior model 212 is a statistical representation that describes how a typical agent will act without considering evidence regarding current states or environmental conditions. As an example, the behavior model 212 may be a prior probability distribution (a "prior") that describes the probability that a typical agent will travel along each of several possible trajectories. Other types of representations can be used as the behavior model 212 using known statistical methods.

The behavior model 212 is determined by the precomputation system 214 using the weak data 216. The precomputation system 214 may be implemented using known statistical modelling techniques and/or other known modelling techniques. Preparation of the behavior model 212 by the precomputation system 214 may occur in advance of the time at which the behavior model 212 is used by the trajectory estimation system 204.

The weak data 216 includes data derived from non-contemporaneous observations (e.g., observations that are not made contemporaneously relative to the estimate or prediction). The weak data 216 does not directly represent the current states of the automated agent 100 and the environment that the automated agent 100 is operating in. In some implementations, the weak data 216 may include non-contemporaneous data derived from observations taken in the environment that the automated agent 100 is operating in. Instead, the weak data 216 includes previously collected data that represents the actions of other agents in the same environment or in different environments.

Although not a direct representation of the actions of the automated agent 100, the weak data 216 is relevant to understanding the trajectories that the automated agent 100 may use to travel through the environment. The weak data 216 is data obtained from a large number of observations of different agents reacting to similar environmental conditions as those present in the environment around the automated agent 100. The observed agents may be, as examples, vehicles operating under manual control by a human operator. The weak data 216 therefore provides a large body of information from which to model the behavior of agents of a particular type when they are confronted with particular environmental features, but does not represent actual current or future intended behavior of the automated agent 100.

One example of the weak data 216 is a collection of historical agent trajectories that include satellite navigation coordinates (e.g., coordinates output by Global Navigation Satellite System compatible devices) across multiple time steps. The agent trajectories are collected from devices with consent from the users of the devices and are aggregated and anonymized. The historical agent trajectories may include metadata describing conditions (e.g., weather) and/or circumstances (e.g., time of day, lighting level) at the time of the data collection, the type of object represented by the agent (e.g., pedestrian, bicycle, or automobile), and geolocation, for example.

In contrast to the weak data 216, the high-quality data 218 is derived from contemporaneous observations of the automated agent 100 and/or the environment that the automated agent 100 is operating in and therefore directly describes current and/or immediate past states of the automated agent 100 and/or the environment that the automated agent 100 is operating in. The high-quality data 218 is information that is relevant to the actual current behavior of the agent with respect to which a decision is being made, which in this example is the automated agent 100.

One example of the high-quality data 218 is low-level motion trajectory information that can be used to predict a distribution over a future state. Low-level motion trajectory information may include three-dimensional position and pose data that is obtained using on-board instruments such as an inertial measurement unit carried by an agent (e.g., the automated agent 100), an image-based tracking system (e.g., using machine vision techniques against images obtained by camera), or a three-dimensional scanning based tracking system (e.g., using three-dimensional tracking techniques against Lidar point clouds or other three-dimensional inputs). Another example of the high-quality data 218 is higher level information, such as image-based features that are identified in obtained images using machine vision techniques, with examples of high level image-based features including gestures, posture, and gaze direction. Another example of high-quality data is world information that may constrain agent actions, such as the locations of sidewalks, crosswalks, curbs, and traffic control devices.

The trajectory estimation system 204 combines the behavior model 212, which is determined using a large amount of the weak data 216, with a relatively small amount of the high-quality data 218 to determine the trajectory estimate 220. As an example, the trajectory estimate 220 may be determined based on the behavior model 212 and the high-quality data 218 according to Bayesian statistical methods. The output of the trajectory estimation system 204 may be a single trajectory (e.g., a geometric description of a path that can be used for travel through an environment) or may be a model (e.g., a likelihood model) that describes multiple trajectories that the automated agent 100 could use to travel through the environment along with metadata describing the probability of use of each of the multiple trajectories. Thus, the trajectory estimate 220 may describe one or more trajectories and probabilities associated with each of the one or more trajectories.

With further reference to FIG. 1, the trajectory estimate 220 may be provided to the control system 108 as an input. As an example, the control system 108 may use the trajectory estimate 220 as an input in determining the planned motion for the automated agent 100. For example, the control system 108 may determine a planned motion using a conventional algorithm, such as a lane following algorithm. Comparison of the planned motion to the trajectory estimate 220 may show a deviation between the planned motion and the trajectory estimate 220. In response, the control system 108 may modify the planned motion based on the trajectory estimate, recompute the planned motion using a different motion planning algorithm, or take other responsive actions.

Figure 3:
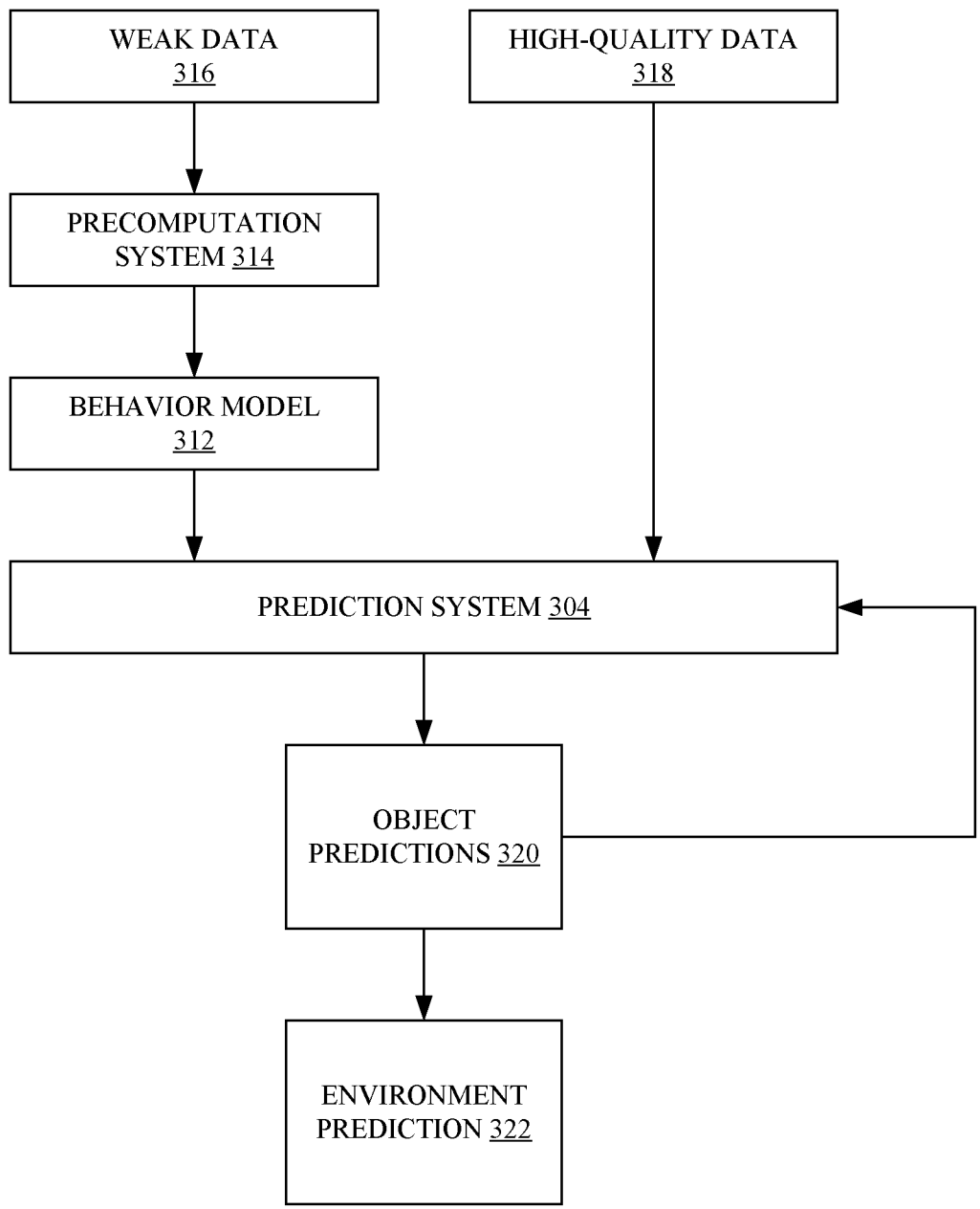
FIG. 3 is a block diagram that shows a prediction system.

FIG. 3 is a block diagram that shows a prediction system 304 of the automated agent 100, which is an implementation of the multimodal input processing system 104. As a first input, the prediction system 304 receives a behavior model 312 that is determined by a precomputation system 314 using weak data 316. As a second input, the prediction system 304 receives high-quality data 318.

For each object in the environment around the automated agent 100, the prediction system 304 generates an object prediction 320 as an output. The object predictions 320 describe future states of the objects in the environment and may include probability values that describe the likelihood that the future states will occur. Each prediction is made by combining historical information and current measurements to predict a distribution over possible actions. The distribution over possible actions may be refined with fine-grained detail, such as image features that are relevant to intention. In some implementations, the object prediction 320 is generated by the prediction system 304 by computing a distribution over a future state. Predicting a distribution over a future state allows for computation of uncertainty, by comparison of the distribution over the future state to the prior probability distribution.

As the object prediction 320 is generated for each object in the environment, the corresponding one of the object predictions 320 can be used as an input by the prediction system 304 for use in determining the object predictions 320 for the other objects in the environment, as the prediction system 304 iteratively predicts future states of objects in the environment. Using the object predictions 320 as an input for determining subsequent ones of the object predictions for other objects in the environment accounts for second-order effects (e.g., how the future state of a first object changes the future state of a second object).

The second order effects describe the manner in which the action of a first object will influence the behavior of other objects. Information about the environment can be used to estimate the second-order effects. For example, the trajectory of a vehicle through an intersection can be predicted, but the time at which the trajectory is executed is conditioned on the behavior of pedestrians or other vehicles. In this particular example, conventional right-of-way ordering rules can be utilized to determine the relative timing of actions by agents that are present in the environment.

The object predictions 320, in combination, define an environment prediction 322, which describes the future states of one or more objects in the environment around the automated agent 100. As an example, in the context of the automated agent 100, the environment prediction 322 can be provided to the control system 108 as an input that is used as a basis for making control decisions and determining commands for the actuator system 106.

The behavior model 312 is a statistical representation that describes how a typical agent will act without considering evidence regarding current states or environmental conditions. As an example, the behavior model 312 may be a prior probability distribution (a "prior") that describes the probability that a typical agent will take a certain action at a certain time step under a particular set of circumstances, such as stopping, proceeding, following a current trajectory, or a changing from a current trajectory to a new trajectory. Other types of representations can be used as the behavior model 312 using known statistical methods.

The behavior model 312 is determined by the precomputation system 314 using the weak data 316. The precomputation system 314 may be implemented using known statistical modelling techniques and/or other known modelling techniques. Preparation of the behavior model 312 by the precomputation system 314 may occur in advance of the time at which the behavior model 312 is used by the prediction system 304.

The weak data 316 includes data derived from observations that are not made contemporaneously. The weak data 316 does not directly represent the current states of the automated agent 100 and the environment that the automated agent 100 is operating in. In some implementations, the weak data 316 may include non-contemporaneous data derived from non-contemporaneous observations taken in the environment that the automated agent 100 is operating in. Instead, the weak data 316 includes previously collected data that represents the actions of other agents in the same environment or in different environments.

Although not a direct representation of the actions of the objects that are present in the environment around the automated agent 100, the weak data 316 is relevant to understanding the intentions and potential future action of the objects, such as trajectories along which the objects may travel through the environment and the timing of travel along those trajectories. The weak data 316 is data obtained from a large number of observations of different agents reacting to similar environmental conditions as those present in the environment around the automated agent 100. The observed agents may be, as examples, vehicles operating under manual control by a human operator, bicycles operated by a human cyclist, and pedestrians. The weak data 316 therefore provides a large body of information from which to model the behavior of agents of a particular type when they are confronted with particular environmental features, but does not represent actual current or future intended behavior of the objects that are present in the environment around the automated agent 100.

One example of the weak data 316 is a collection of historical agent trajectories that include satellite navigation coordinates (e.g., coordinates output by Global Navigation Satellite System compatible devices) across multiple time steps. The agent trajectories are collected from devices with consent from the users of the devices and are aggregated and anonymized. The historical agent trajectories may include metadata describing conditions (e.g., weather), circumstances (e.g., time of day) at the time of the data collection, the type of object represented by the agent (e.g., pedestrian, bicycle, or automobile), and geolocation, for example.

In contrast to the weak data 316, the high-quality data 318 is derived from contemporaneous observations of the objects in the environment around automated agent 100 for which the object predictions 320 are being made, and the high-quality data 318 therefore directly describes current and/or immediate past states of the objects and/or the environment that the objects are operating in. The high-quality data 318 is information that is relevant to the actual current behavior of the agent with respect to whom a decision or prediction is being made, which in this example is the automated agent 100.

One example of the high-quality data 318 is low-level motion trajectory information that can be used to predict a distribution over a future state. Low-level motion trajectory information may include three-dimensional position and pose data that is obtained using on-board instruments such as an inertial measurement unit carried by an agent (e.g., the automated agent 100), an image-based tracking system (e.g., using machine vision techniques against images obtained by camera), or a three-dimensional scanning based tracking system (e.g., using three-dimensional tracking techniques against Lidar point clouds or other three-dimensional inputs). As an example, the high-quality data 318 may be obtained using the sensor system 102 of the automated agent 100. Another example of the high-quality data 318 is higher level information, such as image-based features that are identified in images that are obtained using cameras that are included in the sensor system 102 of the automated agent 100. The image features may be identified in the obtained images using machine vision techniques. Examples of high level image-based features that can be observed for pedestrians include gestures, posture, and gaze direction. Examples of high-level image-based features that can be observed for vehicles include activation of turn signal indicator lights. Another example of the high-quality data 318 is world information that may constrain agent actions, such as the locations of sidewalks, crosswalks, curbs, and traffic control devices.

The prediction system 304 combines the behavior model 312, which is determined using a large amount of the weak data 316, with a relatively small amount of the high-quality data 318 to determine the object predictions 320. As an example, the object predictions 320 may be determined based on the behavior model 312 and the high-quality data 318 according to Bayesian statistical methods. The object predictions 320 may be any type of information that describes the intended future actions and/or states of the objects. As one example, the object predictions 320 may be expressed in terms of a single predicted future state, which may include a confidence metric that describes the likelihood that the future state will occur. As another example, the object predictions may be expressed in the form of a model (e.g., a likelihood model) that describes multiple potential future states of the object with metadata describing the probability of each of the potential future states. In some examples, the object predictions 320 for each object may include a trajectory or set of likely trajectories that describe possible future motion of one of the objects over one or more future time steps.

The prediction system 304 may determine the object predictions 320 in series. The order in which the object predictions are made can be determined based on an ordering of the objects that reflects the manner in which actions of objects will depend on the actions of other objects. In the example of multiple vehicles, bicycles, and/or pedestrians present in a roadway environment, right-of-way regulations that describe the order in which right-of-way is assigned to different users may be utilized to estimate the order in which actions will be taken by the objects. After the object prediction 320 for a first object (e.g., the object expected to act first) is determined, the object prediction 320 for the first object may be utilized by the prediction system 304 for determining the object prediction 320 for a second object (e.g., the object expected to act second). Further predictions can be made in the same manner, until the object prediction 320 for the last object in the prediction order is determined, based in part on the object predictions 320 for all other objects that are the subjects of the object predictions 320.

As an example, second order effects may determine the time at which an object traverses a portion of a planned trajectory, for example, as a result of yielding right-of-way to allow another object to pass. As another example, second order effects may cause an object to modify its planned trajectory to one that does not conflict with the likely trajectory of another object.

In combination, the object predictions 320 are output by the prediction system 304 as the environment prediction 322. The environment prediction 322 is a predicted future state of the environment that can be used as a basis for an automated system, such as the control system 108, to make control decisions, for example, when and how to move through the environment. With further reference to FIG. 1, the environment prediction 322 may be provided to the control system 108 as an input. The control system 108 may use the environment prediction 322 as an input in determining the planned motion for the automated agent 100. For example, the control system 108 may determine a planned motion using a conventional algorithm, such as a lane following algorithm. The environment prediction 322 may be used by the control system 108 to assess the potential for conflicts with the objects, and in response, the control system 108 may revise the planned motion to avoid potential conflicts with the objects.

Figure 4:
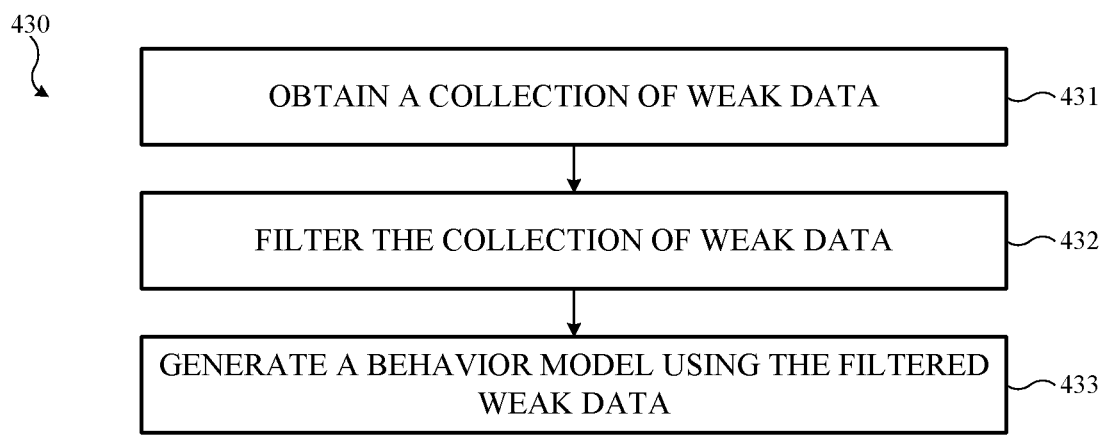
FIG. 4 is a flowchart that shows an example of a process for determining a behavior model.

FIG. 4 is a flowchart that shows a process 430 for determining a behavior model (e.g., the behavior model 212 or the behavior model 312). The process 430 may be implemented using a computing device. As one example, a computing device may include one or more processors, one or more memory devices, and computer-interpretable instructions that are stored in the one or more memory devices and accessible to the one or more processors, wherein the instructions, when executed by the one or more processors, cause the one or more processors to perform the operations of the process 430. In some implementations, the process 430 is implemented in the form of a non-transitory computer-readable storage medium that includes computer-interpretable program instructions that cause operation of the process 430 by one or more processors when executed.

Operation 431 includes obtaining a collection of weak data. The information included in the collection of weak data may be analogous to the description of the weak data 216 or the weak data 316. As an example, the collection of weak data may include a large number of trajectories that are collected with consent from devices as agents travel through various environments.

In operation 432, one or more filtering operations are performed to filter the collection of weak data to identify a subset of the samples that are included in the collection of weak data for inclusion in the weak data that will be used to define the behavior model. Filtering can be performed based on metadata that is included with each of the samples from the collection of weak data. Filtering can also be performed using metadata in combination with side data. In an example where the metadata includes geolocation information, map information can be used as side data by identifying nearby roadway features for each sample from map information based on the geolocation information and using the roadway features as basis for filtering. Examples of nearby roadway features that can be identified based on geolocation and map information include stop-controlled intersections, signal controlled intersections, bicycle lanes, curbs, crosswalks, pedestrian ramps, and sidewalks.

In one example of a filtering operation, the collection of weak data is filtered by object type, which may also be referred to as object classification of object class. A particular object type of interest is chosen for filtering, and other object types are excluded from the data set. As an example, each sample of the weak data may include an annotation that describes the object type. One example of an object type groups moving objects by transportation mode, for example, as pedestrians, bicycles, or automobiles. Filtering by object type allows the resulting behavior model to represent behavior of a specific type of object such that the behavior model may be selected for use in modeling future behavior of objects of the same type.

In another example of a filtering operation, the collection of weak data is filtered by geographic location (geolocation). Filtering by geographic location allows the resulting behavior model to represent behavior at a specific location such that the behavior model may be selected for modeling future behavior of objects at the same geographic location.

In another example of a filtering operation, the collection of weak data is filtered by nearby environment features. Nearby environment features for each sample from the weak data can be determined by cross-referencing geographic location for each sample with map information. Thus, each sample may be further annotated with information that describes nearby environmental features, and the presence of these features may be used for filtering. Examples of environmental features include stop-controlled intersections, signal controlled intersections, bicycle lanes, curbs, crosswalks, pedestrian ramps, and sidewalks.

Filtering based on the presence of nearby environmental features allows the resulting behavior model to represent behavior in the presence of specific types of features such that the behavior model may be selected for modeling future behavior of objects near the same types of environmental features.

In another example of a filtering operation, the collection of weak data is filtered by time of day, which allows the resulting behavior model to represent behavior at a particular time of day.

In another example of a filtering operation, the collection of weak data is filtered based on weather conditions. Metadata such as time of day and geographic location are used to determine the weather conditions that were present at the time that a particular sample was collected, using a separate source of historical weather information. Filtering by weather conditions time of day, which allows the resulting behavior model to represent behavior in the presence of particular weather conditions.

The example filtering operations described above may be applied singly or in combination. As an example, filtering may be applied to limit the weak data to samples from the collection of weak data that represent trajectories of pedestrians near signalized intersections. Other types of filtering may also be applied, in combination with or instead of the examples described above.

In operation 433, the behavior model (e.g., the behavior model 212 or the behavior model 312) is generated from the weak data that results from filtering the collection of weak data (the filtered weak data). The behavior model may be associated with information that identifies the types of samples used to create the behavior model as a result of applying filtering in operation 432. This allows the behavior model to be selected from among multiple behavior models that represent combinations of particular types of agents and circumstances.

Figure 5:
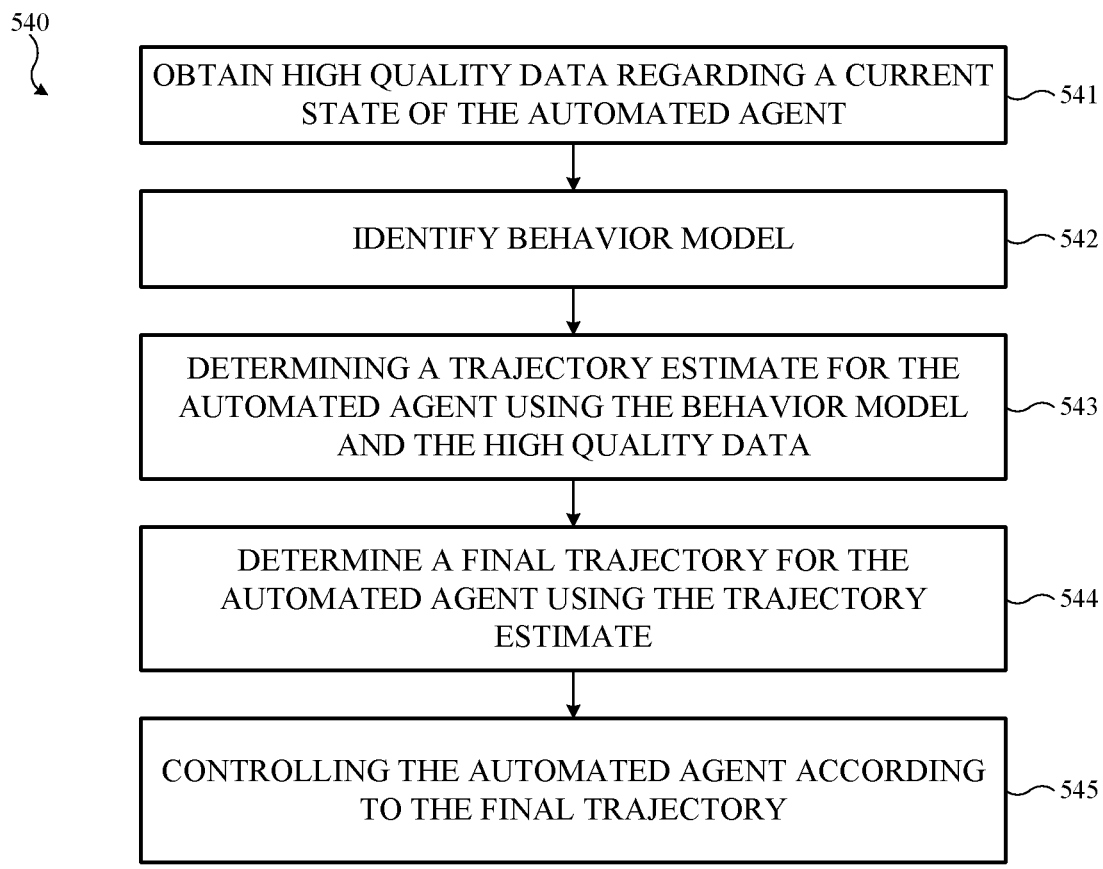
FIG. 5 is a flowchart that shows a process for determining a trajectory estimate.

FIG. 5 is a flowchart that shows a process 540 for determining a trajectory for an automated agent (e.g., the automated agent 100). The process 540 may be implemented using a computing device. As one example, a computing device may include one or more processors, one or more memory devices, and computer-interpretable instructions that are stored in the one or more memory device and accessible to the one or more processors, wherein the instructions, when executed by the one or more processors, cause the one or more processors to perform the operations of the process 540. In some implementations, the process 540 is implemented in the form of a non-transitory computer-readable storage medium that includes computer-interpretable program instructions that cause operation of the process 540 by one or more processors when executed.

Operation 541 includes obtaining high quality data regarding a current state of the automated agent. The high quality data regarding the state of the automated agent may be obtained, for example, from sensors that are associated with the automated agent (e.g., the sensor system 102 of the automated agent 100). The high-quality data may include, as examples, a geographical location of the automated agent, mapping information that represents an environment around the automated agent, an immediate prior trajectory (e.g., including the location of the automated agent at each timestep in a series of two or more immediately prior timesteps) of the automated agent, and motion information (e.g., velocities and/or acceleration rates) for the automated agent.

Operation 542 includes identifying a behavior model. The behavior model that is identified in operation 541 may be implemented, for example, in the manner described with respect to the behavior model 212. The behavior model that is identified in operation 541 may be determined (e.g., generated or created), for example, in the manner described with respect to the process 430.

Identifying the behavior model in operation 542 may include selecting a particular behavior model from a group of existing behavior models that each have different characteristics. The characteristics of each of the existing behavior models may be dependent on the weak data that was used to create the behavior model, as described with respect to the process 430. As an example, in the context of the process 540, determining the behavior model may include obtaining historical trajectory information for a group of objects that belong to a first object class and determining a prior probability distribution that describes likely trajectories for objects that belong to the first object class based on the historical trajectory information, where the behavior model is the prior probability distribution or includes the prior probability distribution along with other information (e.g., metadata).

Identifying the behavior model in operation 542 may be performed based on a current geographical location of the automated agent. The current geographical location of the automated agent may be determined using a satellite positioning sensor that is included among the sensor systems that are carried by the automated agent (e.g., one of the sensors included in the sensor systems 102 of the automated agent 100). In one implementation, current geographical location of the automated agent is used to identify a behavior model having a matching geographic location. For example, a behavior model having a matching geographic location may be one generated using weak data samples that were collected at the same geographical location (e.g., within a threshold distance of) the current geographic location of the automated agent. In another implementation, characteristics of the environment that automated agent is travelling in are determined based on the current geographic location of the automated agent and using map information to determine characteristics (e.g., geometric features, intersection configurations) of the environment. Identifying the behavior model is performed, in this implementation, by selecting a behavior model that was generated using weak data samples that were collected at locations having similar characteristics, which may be determined at the time that the samples are obtained using geolocation information and map information.

Operation 543 includes combining the behavior model that was identified in operation 542 with the high-quality data that was determined in operation 541 to determine a trajectory estimate for the automated agent. The trajectory estimate 220 represents commonly used trajectories for travel through the environment, given the current state of the automated agent. The trajectory estimate may be determined in operation 543, for example, in the manner described with respect to the trajectory estimation system 204 and the trajectory estimate 220.

Operation 544 includes determining a final trajectory for the automated agent based on the trajectory estimate. The trajectory estimate is combined with information from the automated agent that describes a planned motion through the environment. The planned motion may include an origin and a destination, an initial trajectory, a speed and a direction, or any other form of information that can be used to direct motion of the automated agent (e.g., under control of the control system 108). The final trajectory can be determined by, as examples, validating the planned motion based on the trajectory estimate, constraining the planned motion based on the trajectory estimate, selecting between two or more candidate trajectories based on the trajectory estimate, and/or calculating the final trajectory using an algorithm that uses the planned motion and the trajectory estimates as inputs.

Operation 545 includes controlling the automated agent according to the final trajectory. As an example, the final trajectory may be provided to the control system 108 of the automated agent 100 as a basis for determining commands that are sent from the control system 108 to the actuator system 106 to cause motion of the automated agent 100.

One implementation of the process 540 includes obtaining high-quality data regarding a current state of an automated agent; identifying a behavior model; determining a trajectory estimate for the automated agent based on the current state of the automated agent and the behavior model; determining a final trajectory for the automated agent using the trajectory estimate; and controlling the automated agent according to the final trajectory.

Figure 6:
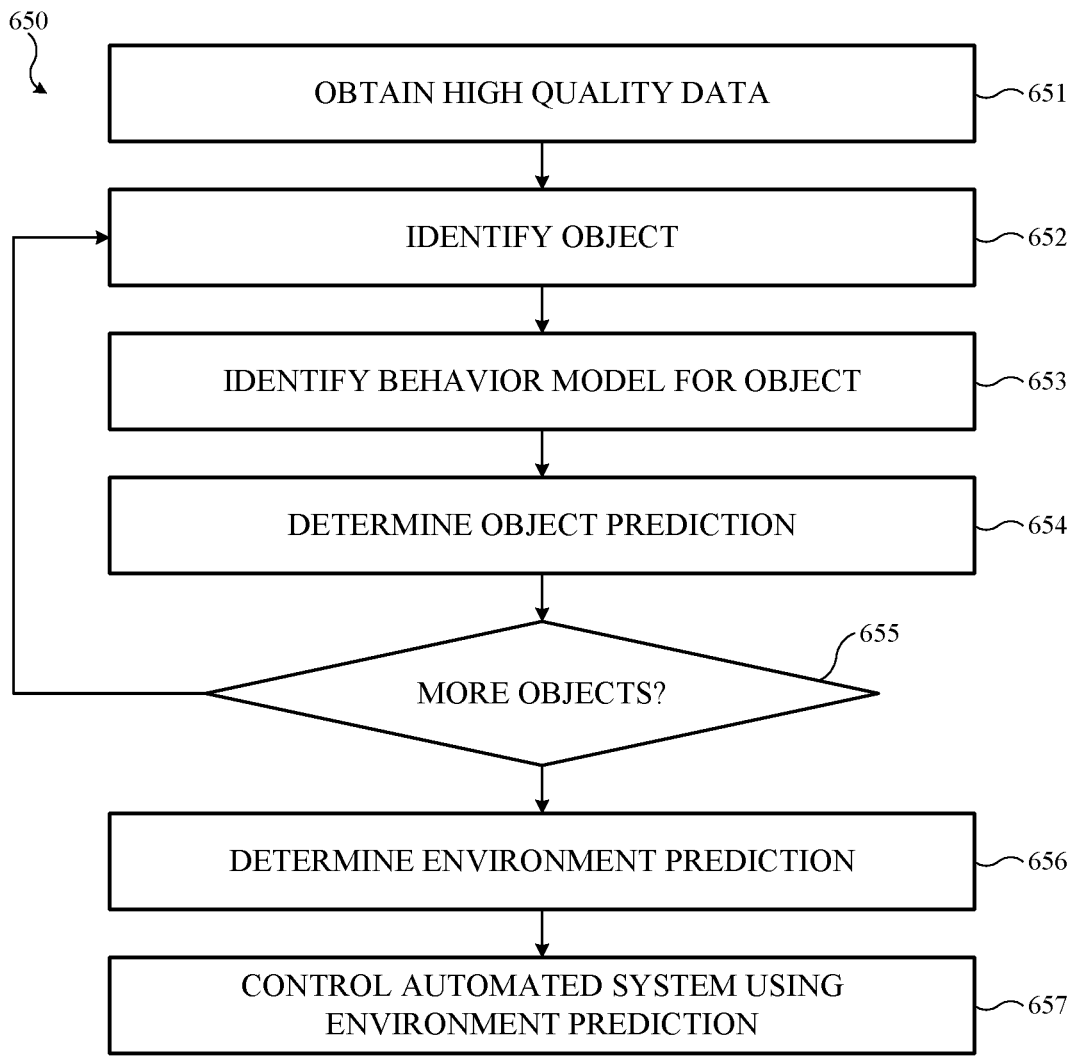
FIG. 6 is a flowchart that shows a process for determining an environment prediction.

FIG. 6 is a flowchart that shows a process 650 for determining an environment prediction that describes a possible future state of an environment. The process 650 may be performed by an automated agent (e.g., the automated agent 100), for use by a control system of the automated agent during movement of the automated agent through the environment. As an example, the environment prediction that is determined in the process 650 may be used as an input by the control system 108 of the automated agent 100. The process 650 may be implemented using a computing device. As one example, a computing device may include one or more processors, one or more memory devices, and computer-interpretable instructions that are stored in the one or more memory devices and accessible to the one or more processors, wherein the instructions, when executed by the one or more processors, cause the one or more processors to perform the operations of the process 650. In some implementations, the process 650 is implemented in the form of a non-transitory computer-readable storage medium that includes computer-interpretable program instructions that cause operation of the process 650 by one or more processors when executed.

In operation 651, high-quality data is obtained. The high-quality data may be obtained using sensors (e.g., one or more of the sensor systems 102 of the automated agent 100 or from other sources. The high-quality data that is obtained in operation 651 may be data that describes one or more of the automated agent, the environment around the automated agent, and objects that are present in the environment around the automated agent. The high-quality data that is obtained in operation 651 may be of the types described with respect to the high-quality data 318.

Operation 651 may include obtaining high quality data regarding current states of the automated agent. The high quality data regarding the state of the automated agent may be obtained, for example, from sensors that are associated with the automated agent (e.g., the sensor system 102 of the automated agent 100). The high-quality data may include, as examples, a geographical location of the automated agent, mapping information that represents an environment around the automated agent, an immediate prior trajectory (e.g., including the location of the automated agent at each timestep in a series of two or more immediately prior timesteps) of the automated agent, and motion information (e.g., velocities and/or acceleration rates) for the automated agent.

Operation 651 may include obtaining high-quality data regarding current states of the environment around the automated agent. As examples, the high-quality data regarding current states of the environment around the automated agent may be determined using images obtained from cameras, three-dimensional information obtained using three-dimensional sensors, and map information corresponding to a current geographic location of the automated agent.

Operation 651 may include obtaining high quality data regarding current states of objects in the environment around the automated agent. The high quality data regarding the states of the objects may be obtained, for example, from sensors that are associated with the automated agent (e.g., the sensor system 102 of the automated agent 100). The high-quality data may include, as examples, an immediate prior trajectory of each of the objects, and motion information (e.g., velocities and/or acceleration rates) for each of the objects, and images showing each of the objects for use in determining further characteristics of the objects using machine vision techniques.

The high quality data regarding the state of the automated agent may be obtained, for example, from sensors that are associated with the automated agent (e.g., the sensor system 102 of the automated agent 100). The high-quality data may include, as examples, a geographical location of the automated agent, mapping information that represents an environment around the automated agent, an immediate prior trajectory (e.g., including the location of the automated agent at each timestep in a series of two or more immediately prior timesteps) of the automated agent, and motion information (e.g., velocities and/or acceleration rates) for the automated agent.

In operation 652, an object is identified in the environment around the automated agent. Operation 652 may include selecting one of the objects in the environment to be the next subject of an object prediction. As previously described, predictions may be made for objects in accordance with an order that is based on an expectation as to how second-order effects will impact the future states of the objects in the environment around the agent. For example, in a roadway environment, right-of-way rules can be used to establish a prediction order as previously described.

In operation 653, a behavior model is identified for the object that was identified in operation 652. The behavior model that is identified in operation 652 may be implemented, for example, in the manner described with respect to the behavior model 212. The behavior model that is identified in operation 653 may be determined (e.g., generated or created), for example, in the manner described with respect to the process 430.

Identifying the behavior model in operation 653 may include selecting a particular behavior model from a group existing behavior models that each have different characteristics. The characteristics of each of the existing behavior models may be dependent on the weak data that was used to create the behavior model, as described with respect to the process 430. Information describing characteristics of objects from which data samples were collected and other characteristics relating to the circumstances of collection (e.g., location, weather, time of day, etc.) can be included as metadata in the behavior model along with the prior probability distribution or other manner of statistical model.

In the context of the process 650, determining the behavior model may be performed by determining an object type (classification) for the object that was identified in operation 652. As an example, machine vision techniques may be used to interpret images of the object and classify it. Examples of classifications include vehicle, bicycle, and pedestrian. Other classifications may be used. By determining the type of object that is the current subject of prediction, the behavior model can be selected based on the object types that from which data samples were collected in order to create the behavior model. Thus, when a pedestrian is the current subject of prediction, the behavior model can be a pedestrian-specific behavior model.

Identifying the behavior model in operation 653 may be performed based on a current geographical location of the object that is the current subject of prediction. The current geographical location of the automated agent may be determined using a satellite positioning sensor, as previously described. In one implementation, current geographical location is used to identify a behavior model having a matching geographic location. For example, a behavior model having a matching geographic location may be one generated using weak data samples that were collected at the same geographical location (e.g., within a threshold distance of) the current geographic location of the automated agent. In another implementation, characteristics of the environment are determined based on the current geographic location of the automated agent and using map information to determine characteristics (e.g., geometric features, intersection configurations) of the environment. Identifying the behavior model is performed, in this implementation, by selecting a behavior model that was generated using weak data samples that were collected at locations having similar characteristics, which may be determined at the time that the samples are obtained using geolocation information and map information.

In operation 654, an object prediction is determined for the object that was identified in operation 652 using the behavior model that was identified in operation 653. Operation 654 may be performed by combining the behavior model that was identified in operation 653 with the high-quality data that was determined in operation 651 to define a model that describes the likelihood that the object will move through the environment in a certain way. The object prediction represents commonly used trajectories for travel through the environment by objects given the current state of the object and surround characteristics of the environment, the agent, and/or other objects. The object prediction may be determined in operation 654, for example, in the manner described with respect to the prediction system 304 and the object predictions 320.

In operation 655, a determination is made as to whether there are more objects in the environment for which predictions remain to be made. If predictions will be made for additional objects, the process returns to operation 652 where an additional object is selected and identified in the environment around the automated agent. If no more predictions will be made, the process proceeds to operation 656.

In operation 656, the object predictions made in one or more iterations of operation 654 for the objects in the environment are combined into the environment prediction. In operation 657, the environment prediction is provided to the automated agent for use as a control input, for example, as described with respect to the control system 108 of the automated agent 100.

One implementation of the process 650 includes obtaining high-quality data regarding a current state of objects in an environment around an automated agent; determining object types for the objects in the environment; identifying behavior models for the objects based on the object types; determining object predictions describing future states of the objects in the environment, wherein the object predictions define an environment prediction; and controlling the automated agent according to the environment prediction.

Figure 7:
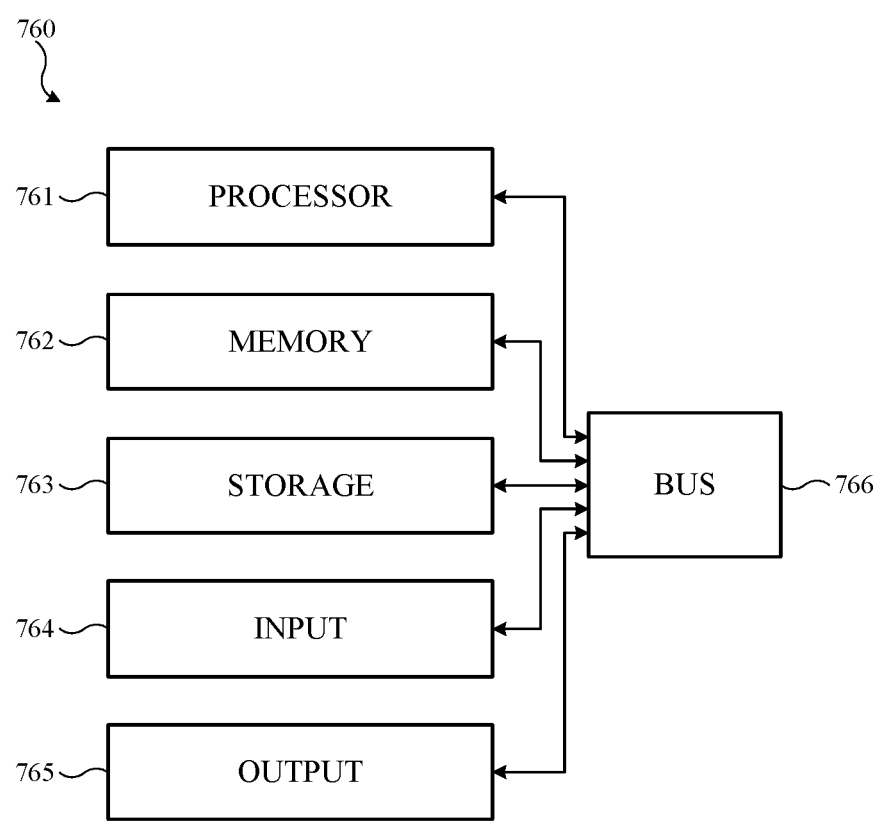
FIG. 7 is an illustration that shows an example of a hardware configuration for a computing device.

FIG. 7 is an illustration that shows an example of a hardware configuration for a computing device that can be used to implement the system described herein. The computing device 760 may include a processor 761, a memory 762, a storage device 763, one or more input devices 764, and one or more output devices 765. The computing device 760 may include a bus 766 or a similar device to interconnect the components for communication. The processor 761 is operable to execute computer program instructions and perform operations described by the computer program instructions. As an example, the processor 761 may be or include one or more conventional processing devices of any type, such as a central processing unit, a field-programmable gate array, or an application specific. The memory 762 may be a volatile, high-speed, short-term information storage device such as a random-access memory module. The storage device 763 may be a non-volatile information storage device such as a hard drive or a solid-state drive. The input devices 764 may include any type of human-machine interface such as buttons, switches, a keyboard, a mouse, a touchscreen input device, a gestural input device, or an audio input device. The output devices 765 may include any type of device operable to provide an indication to a user regarding an operating state, such as a display screen or an audio output.

As described above, one aspect of the present technology is the gathering and use of data available from various sources for building models that make predictions regarding the future states of agents. Such data can include location-based data, images, and so forth. The use of such data, in the present technology, can be used to the benefit of users. For example, the data can be used to predict future states of agents in an environment to facilitate automated control systems.

The present disclosure contemplates that the entities responsible for the collection, analysis, disclosure, transfer, storage, or other use of such data will comply with well-established privacy policies and/or privacy practices. In particular, such entities should implement and consistently use privacy policies and practices that are generally recognized as meeting or exceeding industry or governmental requirements for maintaining data private and secure. These policies should be easily accessible by users, and should be updated as the collection and/or use of data changes. Weak and high-quality data obtained from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such data and ensuring that others with access to the data adhere to their privacy policies and procedures. Further, such entities can subject themselves to evaluation by third parties to certify their adherence to widely accepted privacy policies and practices. In addition, policies and practices should be adapted for the particular types of data being collected and/or accessed and adapted to applicable laws and standards, including jurisdiction-specific considerations. Different privacy practices should be maintained for different data types in each country.

The present disclosure also contemplates embodiments in which users selectively block the use of, or access to, obtained data. For example, systems that use the present technology can be configured to allow users to select to "opt in" or "opt out" of participation in the collection of data during registration for services or anytime thereafter. In another example, users can select not to provide data (e.g., GPS location data) to services that use the present technology. In yet another example, users can select to limit the length of time such data is maintained by services that use the present technology.

Moreover, it is the intent of the present disclosure that data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., serial numbers), controlling the amount or specificity of data stored (e.g., identifying whether an object is a car or a pedestrian but not identifying the specific identity of the object), controlling how data is stored (e.g., aggregating anonymous data), and/or other methods.

What is claimed is:

1. A non-transitory computer-readable storage medium including program instructions executable by one or more processors that, when executed, cause the one or more processors to perform operations, the operations comprising:

obtaining data regarding a current state of an object in an environment around an automated agent;
determining an object type for the object;
determining a characteristic of the environment around the automated agent;
selecting a behavior model from a group of predefined behavior models that are each associated with a respective object type and a respective environment characteristic, wherein the behavior model is selected based on correspondence between the object type for the object and the object type for the behavior model, and based on correspondence between the environment characteristic for the environment around the automated agent and the environment characteristic for the behavior model, and wherein the behavior model is a statistical representation that describes how a typical object corresponding to the object type for the behavior model will act in light of the environment characteristic for the behavior model;
determining an object prediction that describes a future state of the object, wherein the object prediction is determined by a prediction system using the current state of the object and the behavior model for the object as inputs; and
controlling the automated agent according to the object prediction.

2. The non-transitory computer-readable storage medium of claim 1, wherein the data regarding the current state of the object represents a contemporaneous observation, the data regarding the current state of the object includes a current geographic location of the automated agent, the data regarding the current state of the object includes motion information for the object, and the data regarding the current state of the object includes a three-dimensional position and pose of the object.

3. The non-transitory computer-readable storage medium of claim 1, wherein the environment characteristic for the environment around the automated agent includes at least one of a geometric configuration of the environment or an intersection configuration of the environment.

4. The non-transitory computer-readable storage medium of claim 1, wherein the predefined behavior models are each associated with a respective geographic location, and the behavior model is selected further based on correspondence between a current geographic location of the automated agent and the geographic location for the behavior model.

5. The non-transitory computer-readable storage medium of claim 1, wherein the behavior models each include a prior probability distribution that is based on historical trajectories.

6. The non-transitory computer-readable storage medium of claim 1, wherein the predefined behavior models are defined using historical object trajectories that include satellite navigation coordinates across multiple time steps.

7. The non-transitory computer-readable storage medium of claim 1, wherein controlling the automated agent according to the object prediction includes determining a trajectory for the automated agent based on the object prediction.

8. A method for controlling an automated agent in an environment, comprising:
obtaining data regarding a current state of an object in the environment around the automated agent;
determining an object type for the object;
determining a characteristic of the environment around the automated agent;
selecting a behavior model from a group of predefined behavior models that are each associated with a respective object type and a respective environment characteristic, wherein the behavior model is selected based on correspondence between the object type for the object and the object type for the behavior model, and based on correspondence between the environment characteristic for the environment around the automated agent and the environment characteristic for the behavior model, and wherein the behavior model is a statistical representation that describes how a typical object corresponding to the object type for the behavior model will act in light of the environment characteristic for the behavior model;
determining an object prediction that describes a future state of the object, wherein the object prediction is determined by a prediction system using the current state of the object and the behavior model for the object as inputs; and
controlling the automated agent according to the environment prediction.

9. The method of claim 8, wherein the data regarding the current state of the object represents a contemporaneous observation, the data regarding the current state of the object includes a current geographic location of the automated agent, the data regarding the current state of the object includes motion information for the object, and the data regarding the current state of the object includes a three-dimensional position and pose of the object.

10. The method of claim 8, wherein the environment characteristic for the environment around the automated agent includes at least one of a geometric configuration of the environment or an intersection configuration of the environment.

11. The method of claim 8, wherein the predefined behavior models are each associated with a respective geographic location, and the behavior model is selected further based on correspondence between a current geographic location of the automated agent and the geographic location for the behavior model.

12. The method of claim 8, wherein the behavior models each include a prior probability distribution that is based on historical trajectories.

13. The method of claim 8, wherein the predefined behavior models are defined using historical object trajectories that include satellite navigation coordinates across multiple time steps.

14. The method of claim 8, wherein controlling the automated agent according to the object prediction includes determining a trajectory for the automated agent based on the object prediction.

15. An apparatus, comprising:
a memory; and
one or more processors that are configured to execute instructions that are stored in the memory, wherein the instructions, when executed, cause the one or more processors to:
obtain data regarding a current state of an object in an environment around an automated agent;
determine an object type for the object;
determine a characteristic of the environment around the automated agent;
select a behavior model from a group of predefined behavior models that are each associated with a respective object type and a respective environment characteristic, wherein the behavior model is selected based on correspondence between the object type for the object and the object type for the behavior model, and based on correspondence between the environment characteristic for the environment around the automated agent and the environment characteristic for the behavior model, and wherein the behavior model is a statistical representation that describes how a typical object corresponding to the object type for the behavior model will act in light of the environment characteristic for the behavior model;

determine an object prediction that describes a future state of the object, wherein the object prediction is determined by a prediction system using the current state of the object and the behavior model for the object as inputs; and control the automated agent according to the object prediction.

16. The apparatus of claim 15, wherein the data regarding the current state of the object represents a contemporaneous observation, the data regarding the current state of the object includes a current geographic location of the automated agent, the data regarding the current state of the object includes motion information for the object, and the data regarding the current state of the object includes a three-dimensional position and pose of the object.

17. The apparatus of claim 15, wherein the environment characteristic for the environment around the automated agent includes at least one of a geometric configuration of the environment or an intersection configuration of the environment.

18. The apparatus of claim 15, wherein the predefined behavior models are each associated with a respective geographic location, and the behavior model is selected further based on correspondence between a current geographic location of the automated agent and the geographic location for the behavior model.

19. The apparatus of claim 15, wherein the behavior models each include a prior probability distribution that is based on historical trajectories.

20. The apparatus of claim 15, wherein the predefined behavior models are defined using historical object trajectories that include satellite navigation coordinates across multiple time steps.

21. The apparatus of claim 15, wherein controlling the automated agent according to the object prediction includes determining a trajectory for the automated agent based on the object prediction.

* * * * *